Oct. 5, 1965          P. A. KEITH          3,209,524
COTTON PICKER MEANS
Filed July 29, 1963                    2 Sheets-Sheet 1

INVENTOR,
PERCY A. KEITH

Oct. 5, 1965 P. A. KEITH 3,209,524
COTTON PICKER MEANS
Filed July 29, 1963 2 Sheets-Sheet 2
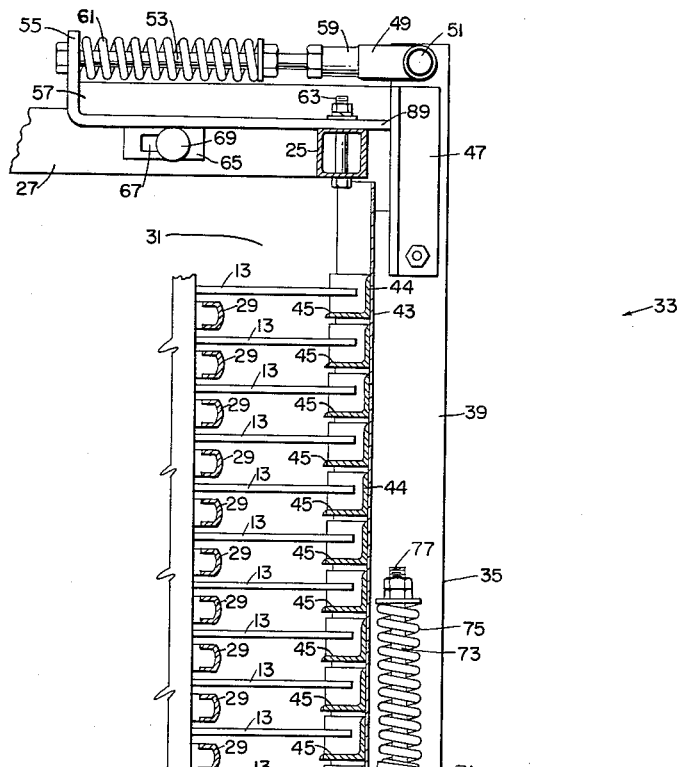
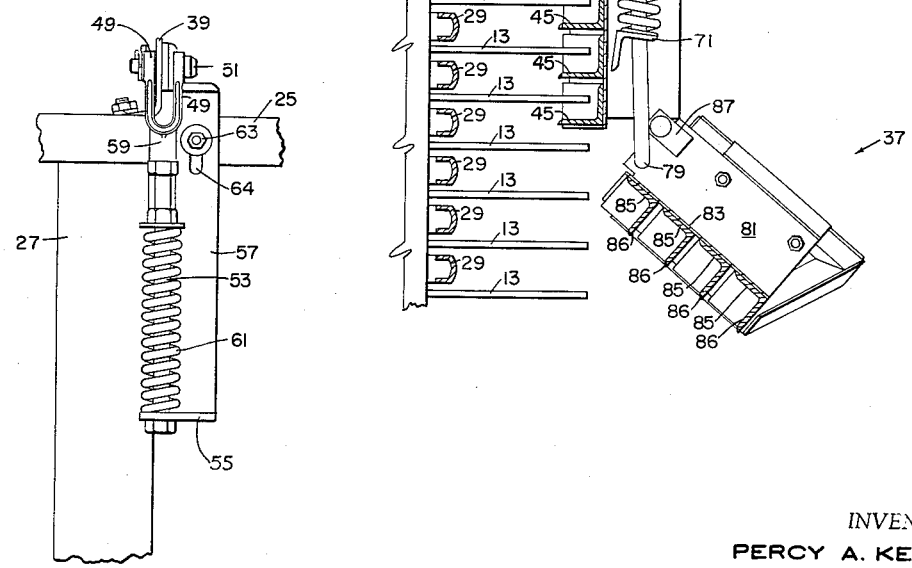
INVENTOR,
PERCY A. KEITH
BY Weatherford & Weatherford
Attys

United States Patent Office 3,209,524
Patented Oct. 5, 1965

3,209,524
COTTON PICKER MEANS
Percy A. Keith, Pine Bluff, Ark., assignor to Ben Pearson, Incorporated, Pine Bluff, Ark., a corporation of Arkansas
Filed July 29, 1963, Ser. No. 298,376
8 Claims. (Cl. 56—42)

This invention relates to certain new and useful improvements in cotton picker means, and more specifically relates to a new and useful arrangement of a crowder door assembly arranged adjacent to the plant tunnel of such devices along the picking side thereof to protect the picking devices from large obstacles that may be encountered as well as to facilitate the entrance of large bushy stalks thereinto and to permit adjustment of the crowder door assembly.

The present invention is particularly adapted for use with cotton picking machines which include a plurality of rotating cotton picking spindles which are conveyed and driven along a picking side of the machine in engagement with the cotton carried by stalks passed thereby. Usually the cotton stalks are compressed into a cotton tunnel which is defined by a series of stalk guides on the spindle side of the tunnel, between which guides the spindles project into adjacency with the cotton to be picked, and an opposite wall of the tunnel is intended to retain the compressed stalks into position for engagement by the projecting spindles, this wall being positioned in adjacency to the free ends of the spindles.

As is usual, the cotton plants enter the picking tunnel through an open front throat by which the plants are gathered and pressed together by means mounted in advance of the picking machine and of the picking tunnel. As the cotton picking machine is moved along the cotton row the spindles are moved past and through the compacted plants, projecting into the plants and engaging with the fiber on the plants in order to remove the fiber therefrom.

In such passage of the cotton picking machines along the rows it is found that in many instances large objects, such as stones, logs and the like, are in the path of the machine moving, and if engaged by the spindles are apt to damage or bend the spindles in the passage therethrough. Similarly, such a large object, if in excess of the space in the plant tunnel, may cause jamming of the operation of the machine and necessitates a shut-down until the damage is cleared. Furthermore, it is found that when tall standing crops are encountered it is desirable to be able to adjust the width of the plant tunnel in order to accommodate the upper thicknesses of such stalks.

Previous devices have heretofore attempted to provide means for permitting some yielding in the plant tunnel on engagement with enlarged objects, but such devices have not been able to accomplish the purpose of the present invention in the manner in which it is here accomplished. The crowder wall which is opposed to the stalk guides preferably includes a crowder door, and it is primarily to the crowder door assembly that the present invention relates, particularly with respect to the operation of the crowder door assembly in connection with the other portions of the cotton picking unit.

The present invention comprises a two-part crowder door which is connected with the picker machine, the upper portion of the door being hinged to the upper portion of the picker machine and spring-urged into position, with the mounting means of the upper portion of the door being adjustable in order to adjust the relative spacing between the upper crowder door portion and the stalk guides.

To the lower portion of the upper crowder door, a lower crowder door adapted to yield upon engagement with enlarged objects is connected in a manner which insures its return to position as soon as the object has been passed, moving it into alinement with the upper crowder door when so returned.

The principal object of the present invention is to provide a cotton picking machine embodying new and useful crowder door assemblies to improve the operation of the picking unit.

A further object of the invention is to provide such means which include an upper crowder door assembly adjustably and resiliently connected to the picking unit, and to the lower end of which is connected a hinged crowder door including spring means urging movement of the lower crowder door into alined condition.

A further object of the present invention is to provide a cotton picker machine with a plant tunnel having a crowder door assembly forming one wall of the tunnel, in which the assembly is adjustable and is resiliently mounted for yielding relative to the opposed portion of the tunnel.

A further object of the invention is to provide a new and useful crowder door assembly for use in connection with cotton picker machines.

A further object of the invention is to provide such a crowder door assembly which includes a main crowder door hinged to spring means in such manner as to constantly urge the door toward the plant tunnel.

A further object of the invention is to provide such an assembly in which the spring means are fixed to the picker machine and are adjustable to adjust the position of the upper main crowder door relative thereto.

A further object of the invention is to provide such an assembly in which a lower crowder door is hinged to the lower end of the main crowder door.

A further object of the invention is to provide such an assembly in which the hinged lower door is spring-urged into alinement with the main crowder door and is adapted to yield under pressure of objects of excess size to permit the passage thereby and discharge therefrom; and A further object of the invention is generally to improve the design, constructions and efficiency of cotton picker machines, particularly in connection with the crowder door assemblies used therewith.

The means by which the foregoing and other objects of the present invention are accomplished and the manner of their accomplishment will be readily understood from the following specification upon reference to the accompanying drawings, in which:

FIG. 3 is a view similar to FIG. 2 showing the crowder door assembly with the lower crowder door in opened condition.

FIG. 4 is a fragmentary top plan view on an enlarged scale illustrating the details of the connection of the crowder door assembly to the picker machine.

Figure 1:
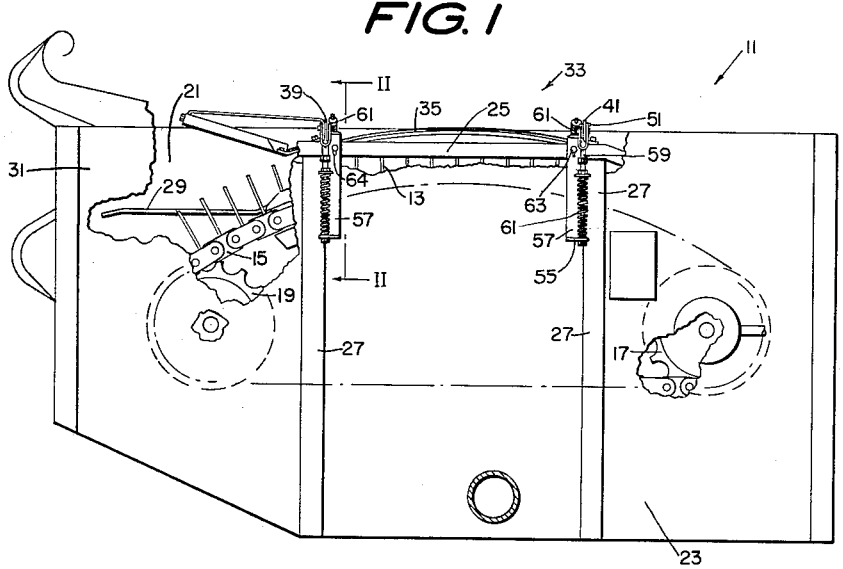
FIG. 1 is a top plan view of a picker machine, partly schematic and partly in section, and with parts broken away for purposes of illustration.
Figure 2:
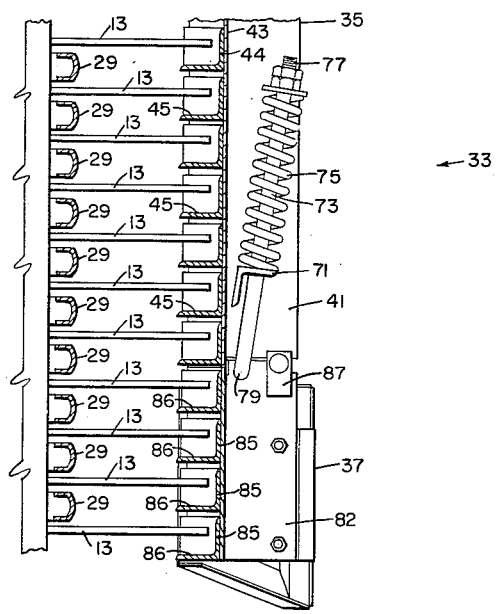
FIG. 2 is a fragmentary sectional view on an enlarged scale taken as on the line II—II of FIG. 1, and illustrating the lower crowder door in normal condition.

Referring now to the drawings in which the various parts are indicated by numerals, the present invention is embodied with a substantially conventional cotton-picking machine or unit 11. The picking machine 11 is to be transported in usual fashion by means (not shown) along rows of standing cotton for the purpose of picking the cotton fiber from the standing plants.

The picking machine includes a multiplicity of rotatable cotton picking spindles 13 which are arranged in vertically disposed groups which may be carried by slats of conventional form or other suitable movable supports, substantially equally horizontally spaced apart. The spindle supports are connected to endless upper and lower chains 15 to form an endless spindle carrier which travels in a longitudinally elongated path, the chains being entrained about sprockets 17, 19, by which drive of the chains and the spindle carriers connected thereto is accomplished. Such drive moves the spindles along the picking side 21 of machine 11, during which the spindles are projected into the path of the cotton plants from which the fiber is to be removed, thence into and along the stripping side 23 of the machine, where the cotton is removed from the spindles by means not here shown.

The picking machine includes a frame 25 which extends peripherally relative to the upper part of the picking machine, and to frame 25 a pair of transverse beams 27 are rigidly connected which extend from the picking side 21 toward the stripping side 23 along the top of the picking unit. Preferably transverse beams 27 abut against frame 25 and are rigidly secured to the frame. It is also preferred that beams 27 extend from side to side of the picking unit and to be similarly rigidly connected to the frame on the opposite side adjacent the stripping side of the unit.

Along the picking side 21 of machine 11 a plurality of stalk guards 29 are mounted and supported at their opposite ends from the framework of the machine. The stalk guards extend longitudinally of the machine and are substantially horizontally disposed in equal vertical spacing.

Stalk guards 29 comprise the inner wall of a plant tunnel 31 through which the cotton plants pass along the picking side of the machine for engagement by the picking spindles. Plant tunnel 31 is open at the front end of the machine in order to receive the plants as the machine is advanced along a cotton row.

Stalk guards 29 are effective in preventing the entry of the cotton plants into the interior workings of the machine, and form a part of the means guiding the plants in intimate relationship with the spindles during picking.

Spindles 13 project through the spaces between adjacent stalk guards 29 so as to project into the plant tunnel outwardly beyond the stalk guards.

The opposite wall of plant tunnel 31 is formed by a crowder door assembly 33. Crowder door assembly 33 is provided to crowd the cotton plants along the picking side of the machine, to retain them in picking intimacy with the spindles, and to furnish protection to the spindles in the machine.

Crowder door assembly comprises an upper crowder door 35 and a lower crowder door 37. Upper crowder door 35 forms the main body of the crowder door assembly. It includes end uprights 39, 41. To uprights 39, 41, an elongated sheet 43 is rigidly attached and spans from upright to upright. Sheet 43 is slightly outwardly bowed to conform to and accommodate the curvature of the path of the spindles when the device is mounted on the machine. Rigidly secured to the inner face of sheet 43 are a plurality of horizontally disposed longitudinally extending crowder members 44, each of which has a flange 45 adapted to project inwardly toward the stalk guards when the device is assembled. Main crowder door 35 is of a height adapted to extend throughout the majority of the height of the bank of spindles.

A plate 47 is fixed to each of uprights 39, 41, adjacent the upper ends of those uprights, plate 47 comprising an angle plate, the projecting flange of which provides a basis for the rigid attachment of a bracket 57 which provides an attachment for the spring adjusting means of the device. Uprights 39, 41 respectively project upwardly beyond plates 47, and the upper end of uprights 39, 41 are respectively embraced by the arms of a yoke 49, to which the upper end of the respective uprights 39, 41 are pivotally connected as by a pivot pin 51.

Extending inwardly from yoke 49, and rigidly secured thereto, is a rod 53 which extends slidably through an upstanding ear 55 which forms part of an attachment bracket 57. Adjustably secured to rod 53 is a head 59 which is threadedly engaged on the rod and is adapted for adjustment relative thereto. Head 59 which comprises the washer and nut on rod 53 provides a seat for a compression spring 61, which surrounds rod 53 and extends inwardly to seat against ear 55.

Crowder door 35 is connected to the machine by the connection of brackets 57 to frame 25 and transverse beams 27. Thus the bracket extends along the beam and across the frame and is adjustably secured to the frame as by a bolt 63, the bracket being slotted as at 64 to permit longitudinal movement of the bracket relative to bolt 63 when desired, the bolt 63 extending through the slot into attaching engagement with frame 25. In addition, bracket 57 is provided with a depending portion 65, which lies alongside beam 27. Portion 65 is longitudinally slotted as at 67 to permit longitudinal movement of the bracket relative to a bolt 69 which extends through slot 67 and into attaching engagement with beam 27. It will be understood that when the desired position of bracket 57 relative to the machine has been established the bolts 63, 69 are tightened to firmly hold the bracket in selected position.

With the bracket so attached to the frame and beams the main crowder door is suspended alongside the outer part of the plant tunnel, with the flanges 45 extending inwardly from the door sheet 43 to project into the spaces between the spindles 13. Spring 61 constantly urges main crowder door 35 toward the plant tunnel and toward the ends of the projecting spindles. The door is suspended and is resiliently mounted so that it may swing or be swung out of vertical alinement, if desired, or under unusual use conditions.

Adjacent the lower end of main door 35, a spring seat 71 is rigidly attached to each of the end uprights 39, 41 of door 35. The spring seat preferably comprises a section of an angle member which is connected to the respective uprights at a slight angle from normal horizontal position, and the spring seat 71 is apertured to receive a spring rod 73 which extends through the spring seat.

Seated on spring seat 71 is compression spring 75, the upper end of which engages against a head 77 carried on the upper end of rods 73. The lower ends of rod 73 extends downwardly beyond seats 71 and beyond the lower end of crowder door 35 and are pivotally attached respectively to the upper end of crowder door uprights 81, 82 of crowder door 37, as by pivot 79, which is positioned closely adjacent to the inner edge of the crowder and is below the junction between the two crowder doors.

Crowder door 37 includes opposite end uprights 81, 82, to which is rigidly attached an elongated sheet 83, which is slightly bowed in conformity with the bowing of sheet 43 in order to accommodate the passage of spindles beyond the door. To the inner face of sheet 83 a plurality of horizontally disposed longitudinally extending crowder members 85 are rigidly secured, each of which has a flange 86 adapted to project inwardly toward the stalk guards when the device is assembled. The members are substantially similar to the crowder members of the main crowder door.

Additionally crowder door 37 is hingedly connected to main crowder door 35, as by hinges 87, which effect hinged interconnection respectively between uprights 39, 41 of door 35, and uprights 81, 82 of door 37. In this manner crowder 37 is swingably connected to crowder door 35 in order to permit movement of the lower crowder door outwardly away from the plant tunnel in the event the device encounters an enlarged obstacle seeking to enter the plant tunnel. Spring 75 constantly exerts pressure urging the crowder door 37 into alinement with crowder door 35 to return to such alinement when it has been moved away from it.

Attached to the forward end of door 37, adjacent the outer part thereof, is a forwardly projecting guide which extends forwardly and flares outwardly away from the lower crowder door. The guide serves to assist in the movement of plants inwardly toward the plant tunnel and the crowding effect of the crowder doors, and furthermore serves to initiate opening movement of the lower crowder door in the event that an obstacle is encountered forwardly of the spindles.

In the operation of the device, the crowder door assembly is suspended from the machine in the manner already described, with the flanges 45, 86 of the respective upper and lower crowder doors 35, 37 projecting between the oppositely extending spindles. The action of spring 75 on main crowder door 35 is such as constantly to urge the lower crowder door 37 toward the spindles, yet being permitted to yield in the event of unusual conditions. The crowder effectively compresses plants passing through the tunnel to be contacted by the spindles and thus for the removal of the cotton fiber.

It will be seen that the crowder door is spaced from the distal ends of the spindles 13 in order to permit free passage of the same along the crowder doors and not to impede therewith. In order to effect and maintain proper alinement and to prevent overtravel of the crowder door toward the spindles, it will be noted that bracket 57 extends outwardly beyond bolt 63 in an extension stop 89 which is abutted by hinge 47 so as to limit possible undesired overtravel of the door inwardly beyond the vertical position relative to the plant tunnel.

When an obstacle is encountered, as has been heretofore mentioned, the lower crowder door is enabled to swing outwardly against the action of spring 75 so as to permit the discharge of such an enlarged obstacle outwardly away from the picking machine. It will be understood that the bank of spindles as they are driven around the machine will resist any attempt of an enlarged object to enter therein and will, in effect, guide any such object toward the lower crowder door.

It will be seen that when the lower crowder door is outwardly hinged the spring rod 73 is permitted to swing with the lower crowder door so as constantly to maintain a pressure on the spring seat urging return of the lower crowder door to normally alined condition, and that when the lower crowder door is being hinged away from normal condition, as under yielding to an obstacle encountered, the pressure on the spring is steadily increasing, additionally urging the return of the crowder door to normal position. It will be seen that the outwardly extending flanges of the uprights 39, 41, and 81, 82, effectively provide a housing for the activities of the various elements of the device.

The present invention provides a crowder door assembly which is suspended at its upper end from the picking machine and is enabled by the mechanism involved to swing to and from adjusted vertical position under unusual conditions. The yielding ability of the lower crowder door readily permits discharge of any enlarged obstacles that may be encountered along the lower part of the path of travel, and altogether the crowder door assembly effectively serves to present the cotton plants to the spindles, and yet to yield to unusual conditions so as to protect the spindles and the mechanism.

I claim:

1. In a cotton picking machine which includes a plant tunnel for passage of cotton stalks through the machine, a plurality of spindles projecting into and across said tunnel for engaging cotton on the stalks passing through the tunnel, a stalk crowder assembly suspended from said machine forming the outer wall of said tunnel, crowding the stalks into the tunnel for spindle engagement, said assembly including a main upper crowder door disposed opposite the upper majority of said spindles in said tunnel, spring means mounted on the top of said machine adjacent the upper end of said door, a pivot carried by said upper door, said spring means connected to said pivot connecting said door to said machine and urging said upper door toward said spindles, a lower crowder door hinged to said upper door and disposed opposite the lower remainder of said spindles in said tunnel, lower spring means interconnecting said doors urging said lower door into alinement with said upper door, said lower door being swingable relative to said upper door against the urging of said lower spring means.

2. In a cotton picking machine which includes a plant tunnel for passage of cotton stalks through the machine, a plurality of spindles projecting into and across said tunnel for engaging cotton on the stalks passing through the tunnel, a stalk crowder assembly suspended from said machine forming the outer wall of said tunnel, crowding the stalks in the tunnel for spindle engagement, said assembly including a main upper crowder door disposed opposite the upper majority of said spindles in said tunnel, spring means mounted on the top of said machine adjacent the upper end of said door, a pivot carried by said upper door, said spring means connected to said pivot connecting said door to said machine and urging said upper door toward said spindles, a lower crowder door hinged to said upper door and disposed opposite the lower remainder of said spindles in said tunnel, lower spring means interconnecting said doors urging said lower door into alinement with said upper door, said lower door being swingable relative to said upper door against the urging of said lower spring means, and means for adjusting the position of said assembly relative to said machine.

3. In a cotton picking machine having a peripheral frame and a transverse beam, which includes a plant tunnel for passage of cotton stalks through the machine, a plurality of spindles projecting into and across said tunnel for engaging cotton on the stalks passing through the tunnel, a stalk crowder assembly suspended from said machine forming the outer wall of said tunnel, crowding the stalks into the tunnel for spindle engagement, said assembly including a main upper crowder door disposed opposite spindles in said tunnel, bracket means mounted on the top of said machine adjacent the upper end of said door overlying said frame and said beam, spring means carried by said bracket means, said bracket at its inner end including a seat for said spring means, said spring means connected at its outer end to said upper door and urging said upper door toward said spindles, said bracket means extending at its outer end beyond said machine abutting said door means to constitute a stop against further movement toward said spindles and prevent overtravel of said door beyond closely alined spaced relation to said spindles, a lower crowder door hinged to said upper door disposed opposite the lower remainder of said spindles to said tunnel, and means on said bracket for adjusting the position of said assembly relative to said machine, the latter said means comprising a slidable attachment between said bracket and said frame and between said bracket and said beam.

4. In a cotton picking machine having a peripheral frame and a transverse beam, which includes a plant tunnel for passage of cotton stalks through the machine, a plurality of spindles projecting into and across said tunnel for engaging cotton on the stalks passing through the tunnel, a stalk crowder assembly suspended from said machine forming the outer wall of said tunnel, crowding the stalks into the tunnel for spindle engagement, said assembly including a main upper crowder door disposed opposite the upper majority of said spindles in said tunnel, bracket means mounted on the top of said machine adjacent the upper end of said door overlying said frame and said beam, spring means carried by said bracket means, said bracket at its inner end including a seat for said spring means, said spring means connected at its outer end to said upper door and urging said upper door toward said spindles, said bracket means extending at its outer end beyond said machine abutting said door means to constitute a stop against further movement toward said spindles and prevent overtravel of said door beyond closely alined spaced relation to said spindles, and a lower crowder door hinged to said upper door disposed opposite the lower remainder of said spindles in said tunnel, means urging said lower door into alinement with said upper door, said lower door being swingable relative to said upper door against the urging of said lower means.

5. In a cotton picking machine having a peripheral frame and a transverse beam, which includes a plant tunnel for passage of cotton stalks through the machine, a plurality of spindles projecting into and across said tunnel for engaging cotton on the stalks passing through the tunnel, a stalk crowder assembly suspended from said machine forming the outer wall of said tunnel, crowding the stalks into the tunnel for spindle engagement, said assembly including a main upper crowder door disposed opposite the upper majority of said spindles in said tunnel, bracket means mounted on the top of said machine adjacent the upper end of said door overlying said frame and said beam, a pivot carried by said upper door, spring means carried by said bracket means, said bracket at its inner end including a seat for said spring means, said spring means connected at its outer end to said pivot and urging said upper door toward said spindles, a lower crowder door hinged to said upper door disposed opposite the lower remainder of said spindles in said tunnel, lower spring means interconnecting said doors urging said lower door into alinement with said upper door, said lower door being swingable relative to said upper door against the urging of said lower spring means, and means on said bracket for adjusting the position of said assembly relative to said machine, the latter said means comprising a slidable attachment between said bracket and said frame and between said bracket and said beam.

6. In a cotton picking machine having a peripheral frame and a transverse beam, which includes a plant tunnel for passage of cotton stalks through the machine, a plurality of spindles projecting into and across said tunnel for engaging cotton on the stalks passing through the tunnel, a stalk crowder assembly suspended from said machine forming the outer wall of said tunnel, crowding the stalks into the tunnel for spindle engagement, said assembly including a main upper crowder door disposed opposite the upper majority of said spindles in said tunnel, bracket means mounted on the top of said machine adjacent the upper end of said door overlying said frame and said beam, a pivot carried by said upper door, spring means carried by said bracket means, said bracket at its inner end including a seat for said spring means, said spring means connected at its outer end to said pivot and urging said upper door toward said spindles, said bracket means extending at its outer end beyond said machine abutting said hinge means to constitute a stop against further movement toward said spindles and prevent overtravel of said door beyond closely alined spaced relation to said spindles, a lower crowder door hinged to said upper door disposed opposite the lower remainder of said spindles in said tunnel, lower spring means interconnecting said doors urging said lower door into alinement with said upper door, said lower door being swingable relative to said upper door against the urging of said lower spring means, a guide connected to and projecting forwardly from said lower door for guiding objects toward said tunnel, and means on said bracket for adjusting the position of said assembly relative to said machine, the latter said means comprising a slidable attachment between said bracket and said frame and between said bracket and said beam.

7. In a cotton picking machine which includes a plant tunnel for passage of cotton stalks through the machine, a plurality of spindles projecting into and across said tunnel for engaging cotton on the stalks passing through the tunnel, a stalk crowder assembly suspended from its upper end from said machine forming the outer wall of said tunnel, crowding the stalks into the tunnel for spindle engagement, said assembly including a main upper crowder door disposed opposite the upper majority of said spindles in said tunnel, bracket means mounted on the top of said machine adjacent the upper end of said door overlying said frame and said beam, a pivot carried by said upper door, spring means carried by said bracket means, said bracket at its inner end including a seat for said spring means, said spring means connected at its outer end to said pivot and urging said upper door toward said spindles, a lower crowder door hinged to said upper door disposed opposite the lower remainer of said spindles in said tunnel, said lower door being swingable relative to said upper door, and means on said bracket for adjusting the position of said assembly relative to said machine, the latter said means comprising a slidable attachment between said bracket and said frame and between said bracket and said beam.

8. In a cotton picking machine having a peripheral frame and a transverse beam, which includes a plant tunnel for passage of cotton stalks through the machine, a plurality of spindles projecting into and across said tunnel for engaging cotton on the stalks passing through the tunnel, a stalk crowder assembly suspended from its upper end from said machine forming the outer wall of said tunnel, crowding the stalks into the tunnel for spindle engagement, said assembly including a main upper crowder door disposed opposite the upper majority of said spindles in said tunnel, bracket means mounted on the top of said machine adjacent the upper end of said door overlying said frame and said beam, spring means carried by said bracket means, said spring means connected at its outer end to said upper door means and urging said upper door toward said spindles, said bracket means extending at its outer end beyond said machine abutting said upper door means to constitute a stop against further movement toward said spindles and prevent overtravel of said door beyond closely alined spaced relation to said spindles, a lower crowder door hinged to said upper door disposed opposite the lower remainder of said spindles in said tunnel, said lower door being swingable relative to said upper door, and means on said bracket for adjusting the position of said assembly relative to said machine.

References Cited by the Examiner
UNITED STATES PATENTS

| | | | |
|---|---|---|---|
| 1,004,835 | 10/11 | White | 56—14 |
| 2,652,676 | 9/53 | Rust | 56—42 |
| 2,671,298 | 3/54 | Fergason | 56—14 |
| 3,082,590 | 3/63 | Keith | 56—42 |

ABRAHAM G. STONE, *Primary Examiner.*

RUSSELL R. KINSEY, *Examiner.*